United States Patent [19]

Moore

[11] Patent Number: 4,838,736
[45] Date of Patent: Jun. 13, 1989

[54] RESILIENT BUSH

[75] Inventor: Alan F. Moore, Burbage, England

[73] Assignee: Dunlop Limited a British Company, United Kingdom

[21] Appl. No.: 126,871

[22] Filed: Nov. 30, 1987

[30] Foreign Application Priority Data

Dec. 13, 1986 [GB] United Kingdom ............. 8629816

[51] Int. Cl.⁴ .................... B63B 21/50; E02D 5/74
[52] U.S. Cl. .................................. 405/224; 403/369; 192/78; 405/195
[58] Field of Search ............... 405/224, 204, 203, 195, 405/196; 192/78; 403/227, 369; 114/264, 265

[56] References Cited

U.S. PATENT DOCUMENTS

| | | | |
|---|---|---|---|
| 1,750,607 | 3/1930 | Short | 403/227 X |
| 2,212,153 | 8/1940 | Eaton et al. | 403/227 X |
| 2,749,160 | 6/1956 | Cowles | 403/227 |
| 4,643,609 | 2/1987 | Biass | 403/369 |

FOREIGN PATENT DOCUMENTS

1308346 11/1970 United Kingdom .
1516572 3/1976 United Kingdom .

Primary Examiner—Dennis L. Taylor
Attorney, Agent, or Firm—Stevens, Davis, Miller & Mosher

[57] ABSTRACT

In a resilient bush comprising elastomeric material sandwiched between inner and outer rigid members the elastomeric material is subject to radial compression without any need to deform either of the rigid members. The elastomeric material is part of a bearing assembly for insertion between the rigid members. The bearing assembly also comprises a pair of support members arranged respectively to bear against the inner and outer rigid members. The support members are movable one relative to the other in a plane perpendicular to the direction of the length of the bush thereby to result in radial compression of the elastomeric material.

20 Claims, 8 Drawing Sheets

RESILIENT BUSH

This invention relates to a resilient bush of the kind comprising resilient material interposed between a rigid inner member and a surrounding outer, usually tubular shaped, substantially inextensible rigid member.

The invention relates in particular, though not exclusively, to a resilient bush of the aforementioned kind and of a large size, typically having an outer diameter of at least 300 mm in the case of a bush of circular external cross-sectional shape.

Conventionally the resilient material of a bush is comprised by an annular layer of elastomeric material which is located between and bonded to confronting surfaces of inner and outer substantially inextensible and peripherally continuous one-piece rigid members of metallic material. In order that the bush may have a high load bearing capability without excessive deformation when subject to torsional and/or radial loads it is common to pre-load the elastomeric material in compression either by expanding the inner rigid member, where that is of a hollow deformable nature, by swaging the outer rigid member or by force fitting one of the rigid members over the elastomeric material.

In the case of resilient bushes having an external diameter greater than in the order of 150 mm the aforementioned bonding and deformation operations are more difficult to perform than on small size bushes, and the difficulties are particularly great if the external diameter of the bush exceeds in the order of 300 mm.

The present invention seeks to provide a resilient bush and a method of manufacture of a resilient bush which may be of large external peripheral dimension and in which the aforementioned difficulties are mitigated or overcome.

In accordance with one of its aspects the present invention provides a resilient bush comprising an inner rigid member, a substantially inextensible outer rigid member which extends around and is spaced from the inner rigid member and interposed between said rigid members at least one resilient bearing, said resilient bearing comprising a layer of resilient material disposed between and adhered to a pair of rigid support members, one rigid support member of said pair being an inner support member supported by the inner rigid member and the other rigid member of said pair being an outer support member supported by the outer rigid member and said support members being movable or having been moved one relative to the other in a peripheral direction as considered in a plane perpendicular to the direction of the length of the bush whereby the resilient material becomes or is loaded in compression between said support members as considered in a generally radial direction of the bush.

Preferably the bush comprises at least one pair of said resilient bearings and preferably said bearings are disposed such that the shear load arising in one bearing due to relative movement of its associated support members to effect said loading of the resilient material in compression substantially equals and opposes the shear load arising in the other bearing of the pair due to relative movement of its associated support members.

Typically the resilient material is an elastomeric material such as natural rubber though other material such as thermoplastic elastomers may be used.

The or each layer of resilient material may be adhered to the associated rigid support members by bonding, by mechanical interlock or, for example, by the use of adhesives either alone or in combination.

One or more substantially rigid insert layers may be provided in the resilient material to lie generally parallel with the confronting surfaces of the bearing support members.

Preferably the resilient bearing is formed with the inner and outer support members thereof laterally offset in said peripheral direction prior to assembly with the inner and outer rigid members. Subsequent to positioning of the resilient bearing between the rigid members the laterally offset support members are urged to move laterally relative to one another in the peripheral direction of the bush such that said relative movement results in pre-loading of the resilient material in compression between said support members.

Preferably the inner and outer support members of one resilient bearing of a pair are moved relative to one another in a peripheral direction opposite that in which the support members of the other resilient bearing of the pair are moved relative to one another.

The confronting surfaces of the inner and outer rigid support members may be planar, part-cylindrical or of other shape selected having regard to the relative movement of the confronting surfaces during said relative movement of the support members in the peripheral direction so as to result in compression of the resilient material.

Preferably at least one of the confronting surfaces of said inner and outer rigid support members is inclined relative to said direction of relative lateral, peripheral movement whereby said movement results in compression of the interposed resilient material. Additionally or alternatively, however, at least one of the respective pairs of confronting surfaces of the bearing support members and rigid bush members is inclined relative to said direction of relative movement whereby said movement results in compression of the interposed resilient material. That is, a radially outer surface of an inner rigid member or an inner surface of an outer rigid member may be inclined relative to said direction of lateral, peripheral movement such that said movement results in compression of the resilient material.

Where at least one pair of resilient bearings is provided, either the inner or, more preferably, the outer rigid support members of the two bearings of a pair may be integral with one another.

Preferably the construction of the bush is such that when the support members of a bearing have been moved to load the resilient material in compression said material is substantially uniformly loaded in compression and/or is equally loaded at two longitudinally extending edges of the material.

Preferably the bush is of a generally circular cross-sectional shape thereby to have cylindrically shaped and confronting radially outwardly and inwardly facing surfaces of the inner and outer rigid members respectively for contact respectively by a part-cylindrical shaped inner surface of a bearing inner rigid support member and a part-cylindrical shaped outer bearing surface of an outer rigid support member. Especially in a bush construction of this kind the confronting surfaces of the rigid support members preferably are each of a part-cylindrical shape, it being further preferred that when said support members are positioned laterally to compress the resilient material therebetween the two confronting surfaces have a common axis of curvature. The cylindrical inner surface of the outer rigid member may have a diameter greater than 150 mm, for example greater than 300 mm.

The substantially inextensible outer rigid member preferably is a peripherally continuous one-piece outer rigid member which may be of a substantially tubular form or be comprised by a solid member formed with an aperture.

To achieve a common axis of curvature when the resilient material is compressed it is taught in accordance with a further aspect of the present invention that when the resilient material of a bearing is unstressed said respective axes of curvature shall be offset. The extent to which said axes of curvature are offset shall be determined having regard to the relative angular movement to be experienced by the rigid support members in moving in continual contact with cylindrical surfaces of the inner and outer rigid members from a condition in which the resilient material is unstressed to one in which it is at the desired level of pre-compression.

The or each resilient bearing may extend over substantially the whole of the axial, longitudinal length of the bush or two or more axially successive and either spaced or adjacent resilient bearings may be provided as considered in said axial direction.

In general a resilient bush in accordance with the present invention will possess a low level of axial stiffness especially as compared with the stiffness under radial and torsional load. To restrict relative axial movement of the inner and outer rigid members one of said rigid members may be provided with an abutment, optionally a peripherally continuous abutment, which extends in a direction towards the other rigid member and is arranged for contact by the rigid support member(s) adjacent said other rigid member when a sufficient level of relative axial movement arises.

Said abutment which limits relative axial movement or other radial restriction abutment means may be provided on the inner or outer rigid member to confront the other rigid member and abut said other rigid member when a prescribed magnitude of relative movement occurs in a generally radial direction.

Preferably the compression in the resilient material in the resilient bush, when pre-compressed, is such that a maximum relative movement of the rigid members, as limited by any radial-restriction abutment means, in response to an externally applied radial load does not totally relieve the pre-compression in resilient material positioned at a peripheral location at which said movement reduces the magnitude of said pre-compression.

It is further taught by the present invention that prior to movement of the support members to compress the interposed resilient material the radial extent of the or each resilient bearing shall be less than that of any radial abutment extending from a rigid member which on assembly may carry the or each bearing. Said abutment may therefore serve to protect the or each bearing as it and a rigid member are moved axially into position relative to the other rigid member.

Preferably the resilient bush comprises three or more pairs of said resilient bearings, with said pairs being uniformly positioned between the inner and outer rigid members as considered in a peripheral direction perpendicular to the direction of the length of the bush.

To effect pre-compression of the resilient material preferably provision is made for inserting a wedge member or other expansion device between each of the successive pairs of resilient bearings, movement of the expansion devices causing the contacted rigid support members of the bearings to move apart and thereby effect compression of the resilient material of said bearings.

A resilient bush in accordance with the present invention is particularly suitable for use as a cross-load bearing in the mooring line of an offshore tension leg platform or other such floating offshore structure. Such structures commonly are provided with several mooring lines which each extend between the seabed and the floating structure and some of which extend obliquely relative to one another. Because of the oblique relative orientation of the lines and movement of the structure when in use, the high tensile loads carried by the lines have associated therewith generally horizontal transverse loads which manifest themselves at the flexible joints provided at the ends of each line where it connects respectively to a seabed anchor point and the floating structure. The resilient bush of the present invention can be constructed to the required large dimensions and can provide the desired load carrying ability in combination with high radial and torsional stiffness. Furthermore it provides a low axial stiffness which facilitates accommodation of the significant axial movement arising with change of tension in a mooring line and especially the change arising during initial installation.

Although the resilient bush of the present invention has a good ability to accommodate axial movement, to permit very large axial movement to be accommodated at least one of the interfaces of a rigid member and bearing support member may be capable of relative slipping movement in said axial direction. A layer of material of a selected coefficient of friction may be provided at said interface to provide the desired frictional resistance to relative sliding movement in the axial direction.

To ensure that the ability of the bush to resist torsional loads is not affected adversely by the ability of a bearing support member to slip relative to a rigid member, guide means may be provided to ensure that the slipping capability is confined to the axial direction.

Embodiments of the present invention will now be described, by way of example, with reference to the accompanying diagrammatic drawings in which.

A resilient bush 10 in accordance with the present invention serves as a cross-load bearing in the flexible joint 11 of a mooring line 12,13 of an offshore structure.

Figure 1:
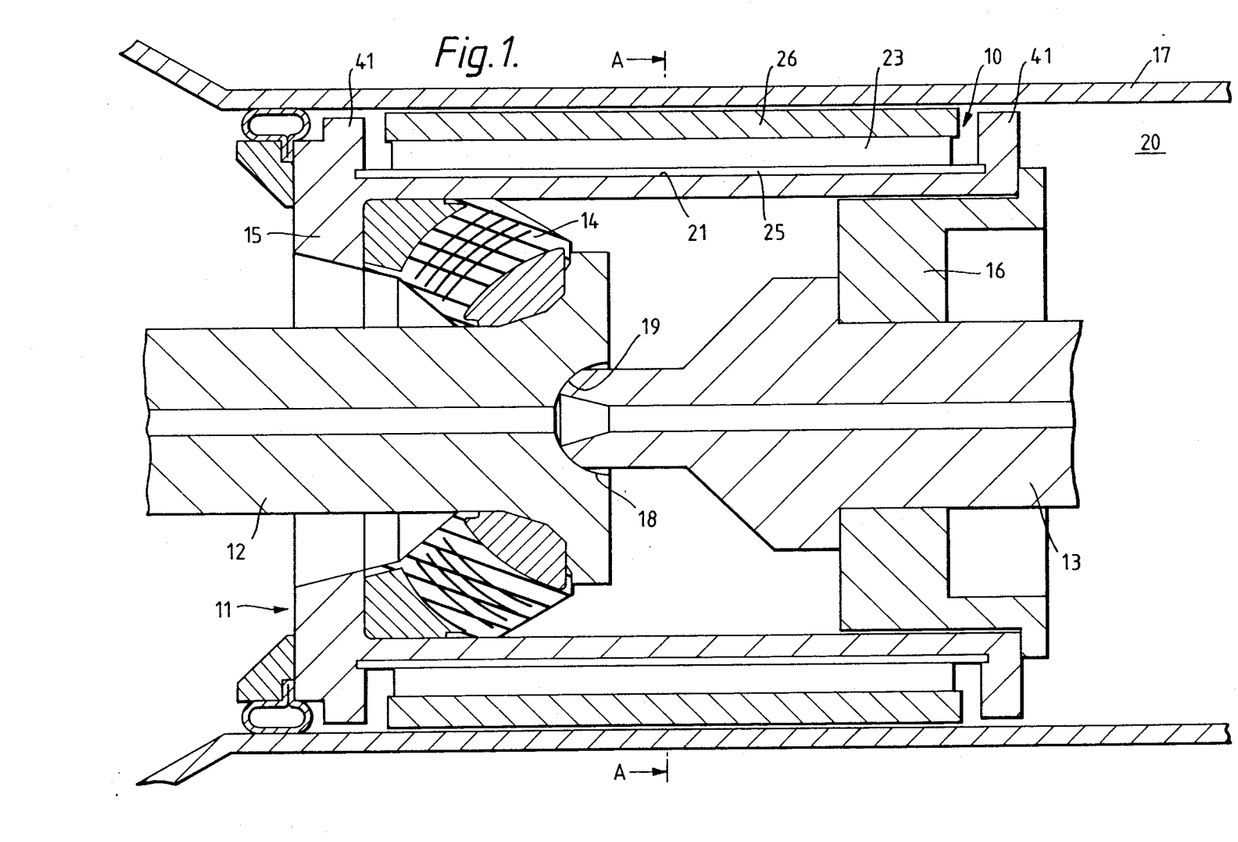
FIG. 1 is a longitudinal sectional view of a resilient bush of the present invention in situ in the flexible joint of a mooring line.

The flexible joint 11 associated with the offshore structure comprises a part-spherical elastomeric bearing 14 which resiliently supports within a tubular inner rigid member 15 that mooring line section 12 which extends to a seabed anchorage. The member 15 has secured thereto an abutment ring 16 which supports that mooring line section 13 which extends within the rigid tubular leg structure 17 to an anchor point (not shown) within the leg structure. The end of the mooring line section 12 has a concave part-spherical bearing face 18 which abuts a complementary shaped convex part-spherical bearing face 19 at an end of the mooring line section 13. Accordingly forces causing the mooring line section 12 to incline relative to the longitudinal direction of the leg structure 17 and thus relative to the mooring line section 13 result in the end of the line section 12 pivotting about the end of the line section 13. In consequence a sideways, radial load is exerted on the part-spherical elastomeric bearing 14 which therefore applies a radially directed load, referred to herein as a "cross-load", to the inner rigid member 15.

The resilient bush 10 of the present invention is intended to withstand said cross-loads and any torsional loads with only small deformation but to accommodate relatively large deformation in the longitudinal, axial direction as the inner rigid member 15 moves relative to the leg structure 17.

Figure 2:
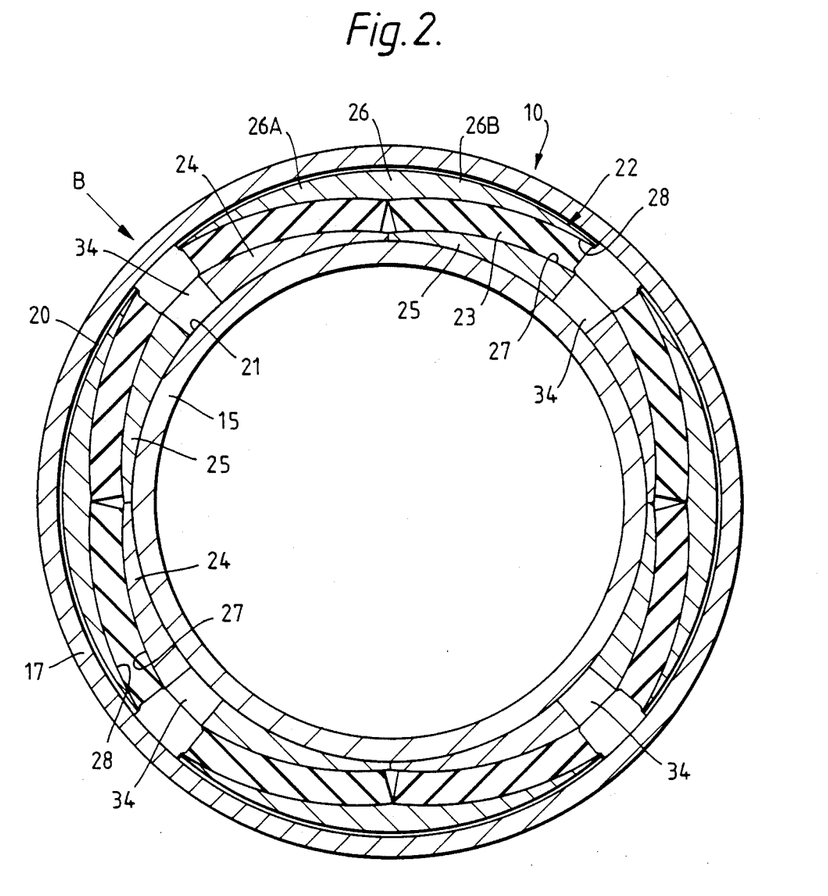
FIG. 2 is a cross-sectional view of the bush shown in FIG. 1 taken on the line A—A of FIG. 1.

Said leg structure 17 serves as a substantially inextensible and peripherally continuous one-piece outer rigid member of the bush 10 and has a cylindrical shaped inner surface 20 which extends around and is spaced from a cylindrical outer surface 21 of the inner rigid member 15. Interposed between said cylindrical surfaces and uniformly disposed in the circumferential direction are four pairs of resilient bearings 22 which will now be described in more detail.

Each pair of resilient bearings 22 comprises two substantially part-cylindrical shaped layers 23 of an elastomeric material such as natural rubber, each interposed between and bonded to a respective rigid inner support member 24,25 and a respective rigid outer support member 26A,26B. The rigid outer support members 26A,26B of each pair are integral and comprise a rigid outer support member unit 26.

The outer surface of the outer support member unit 26 and the inner surfaces of the inner support members 24,25 are each of part-cylindrical shape which conform respectively with the inner surface 20 of the leg structure 17 and the outer surface 21 of the inner rigid member 15. Said surfaces of the support members therefore have axes of rotation which are coincidental with one another and with the common axis of rotation of the surfaces 20,21 in the assembled condition, shown in FIG. 2.

The confronting surfaces 27,28 of the inner and outer rigid support members also are of a part-cylindrical shape and in the assembled condition shown in FIG. 2 and in which the interposed elastomeric material is pre-compressed said surfaces have a common axis of rotation. In that condition the spacing of said surfaces is uniform in the radial direction relative to said axes of rotation and also in the longitudinal direction of the bush. As also apparent from FIG. 2 the inner rigid support members 24,25 of each pair are in contact with one another in that assembled condition and the bearings are of equal extent in the circumferential direction.

The common axis of rotation 29,30 (see FIG. 4) of the confronting surfaces 27,28 is offset relative to the common axis of rotation 31 of the surfaces 20,21 and the inner and outer surfaces of inner and outer rigid support members respectively. In each pair of pre-stressed resilient bearings the confronting surfaces 27,28 of the support members 24,26A and 25,26B of the two bearings have respective common axes of rotation 29,30 which are spaced equally from the common axis of rotation 31 of the surfaces 20,21 and are symmetrically disposed about a plane P extending through said axis of rotation 31 and the interface F of the inner support members 24,25. Said offset axis of rotation 29,30 of each of the four bearings lies on a circular locus about the common axis of rotation 31 of the surfaces 20,21.

Figure 4:
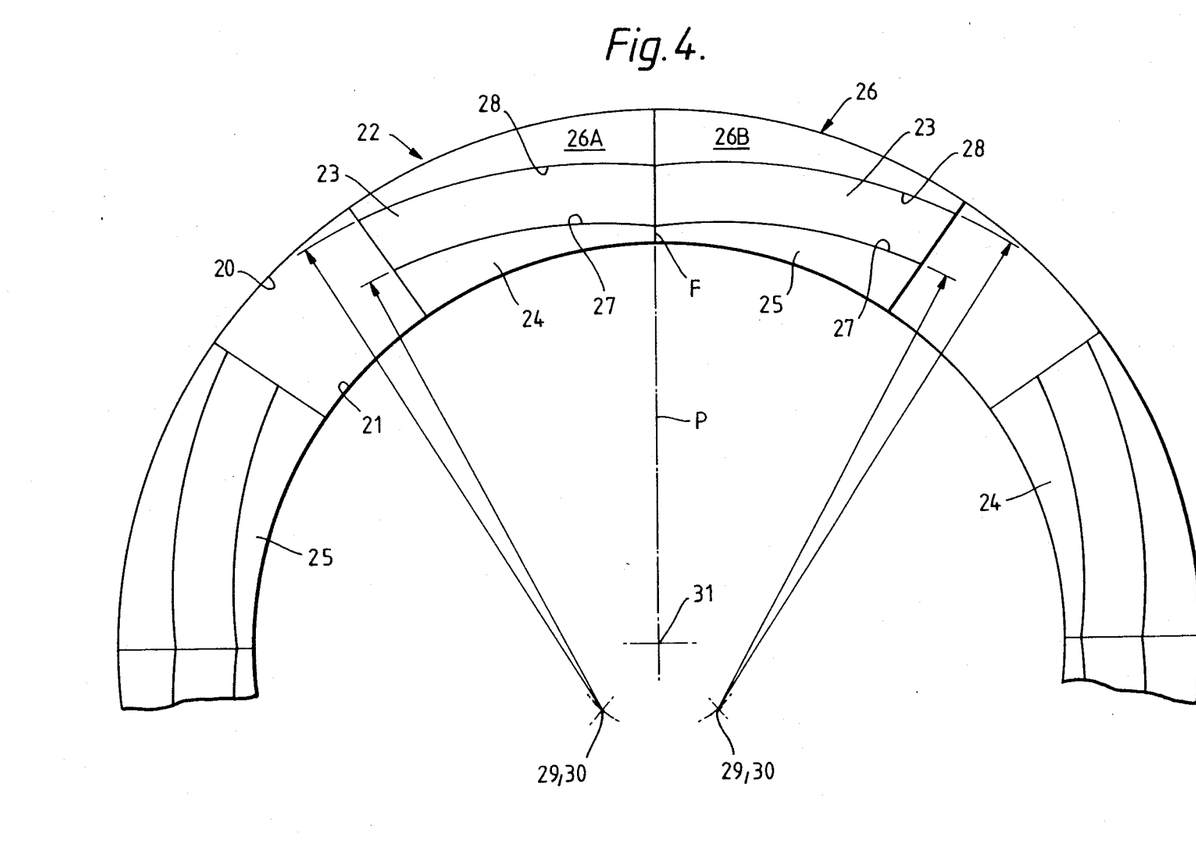
FIG. 4 shows an end view of a part of the bush of FIG. 1 in the direction of an arrow 'A'.

FIGS. 2 and 4 show the resilient bearings 22 in a prestressed condition, but in constructing the assembly of FIGS. 1 and 2 the bearings initially are in an unstressed condition when positioned between the inner rigid member 15 and the leg structure 17.

Figure 5:
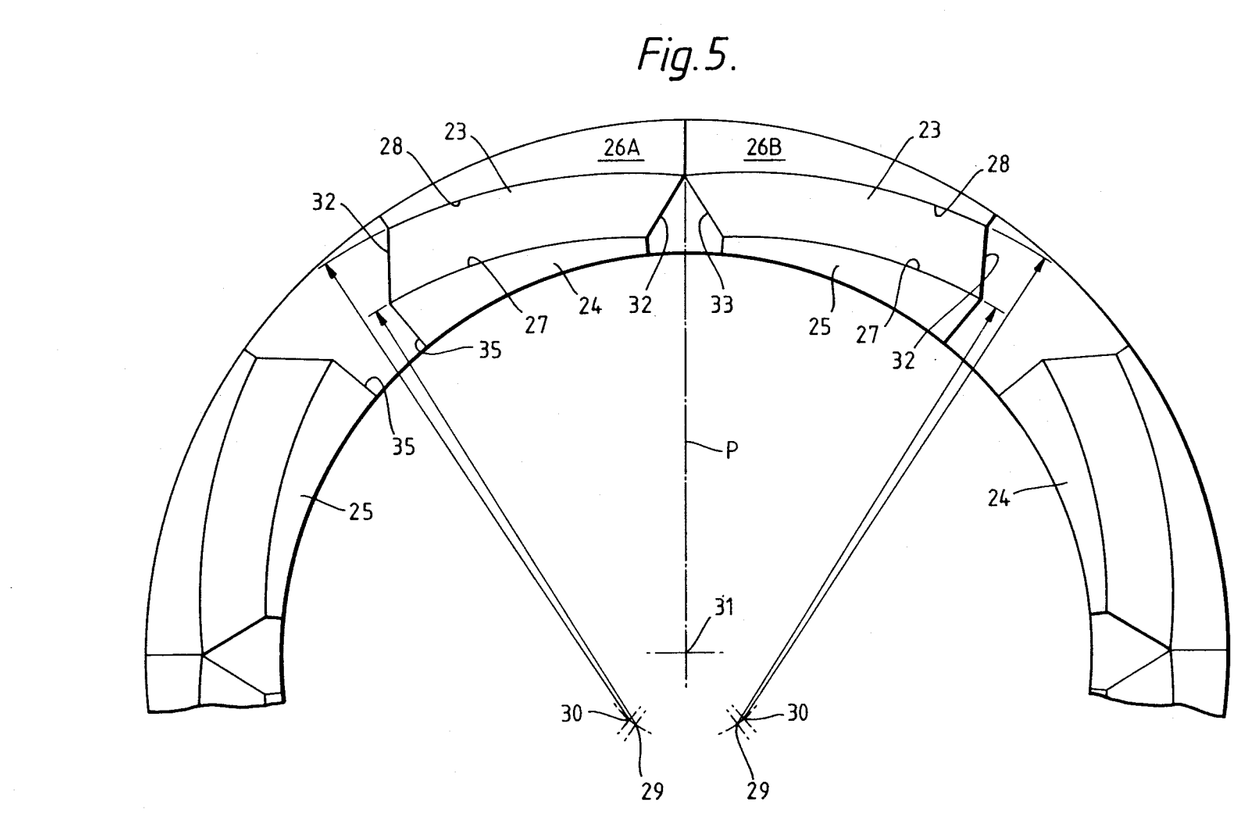
FIG. 5 corresponds to FIG. 4 but shows the structure prior to pre-compression.

FIG. 5 corresponds with that of FIG. 4 but shows a pair of resilient bearings in an unstressed condition. In the unstressed condition the respective inner and outer support members 24,26A and 25,26B of each pair are laterally offset in the circumferential direction. The outer surface of the outer support member and inner surface of the inner support member have their axes of rotation 31 common with one another but the respective axes of rotation 29,30 of the confronting surfaces 27,28 of each bearing of the pair are slightly offset. In consequence of said offset the radial spacing of the surfaces 27,28 varies in the circumferential direction. Said spacing, which determines the thickness of the unstressed layer 23 of elastomeric material, is selected such that when the support members undergo relative lateral movement between the inner rigid member 15 and the leg structure 17 to arrive at the condition of FIG. 2 the compression of each of the exposed longitudinal edges 32,33 of each layer 23 is substantially equal.

Figure 6:
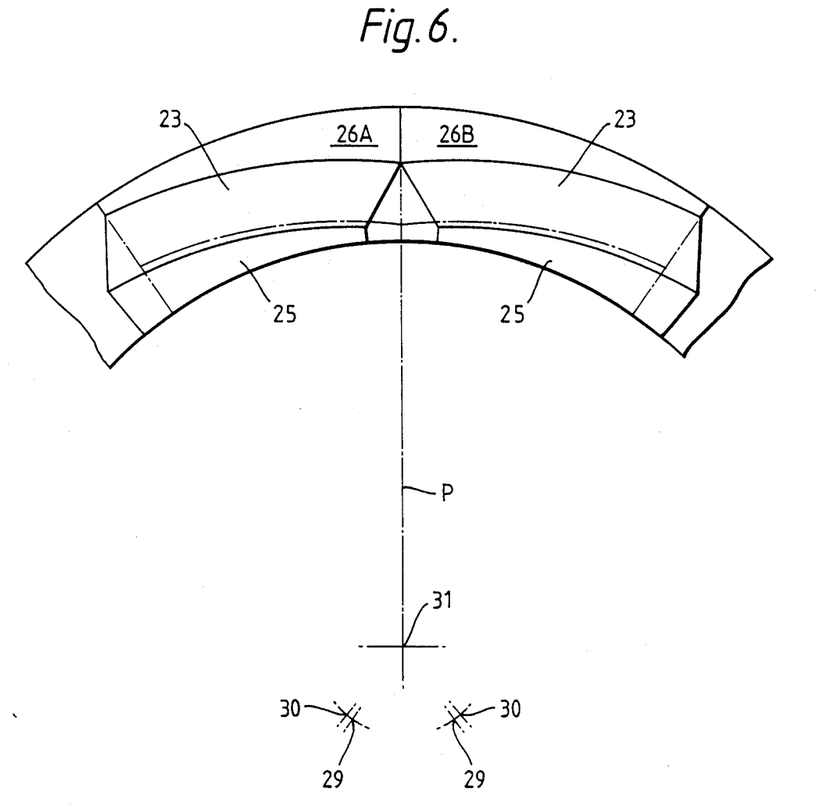
FIG. 6 shows a comparison of FIGS. 4 and 5.

FIG. 6 shows for further clarity of explanation superimposed outlines of one pair of bearings in an unstressed condition and when subject to pre-compression.

To effect pre-compression of the resilient bearings when installed between the inner rigid member 15 and leg structure 17 an elongate ram 34 (see FIGS. 2 and 3) is provided between confronting edge surfaces 35 of the inner rigid support members of successive pairs of the resilient bearings.

Figure 3:
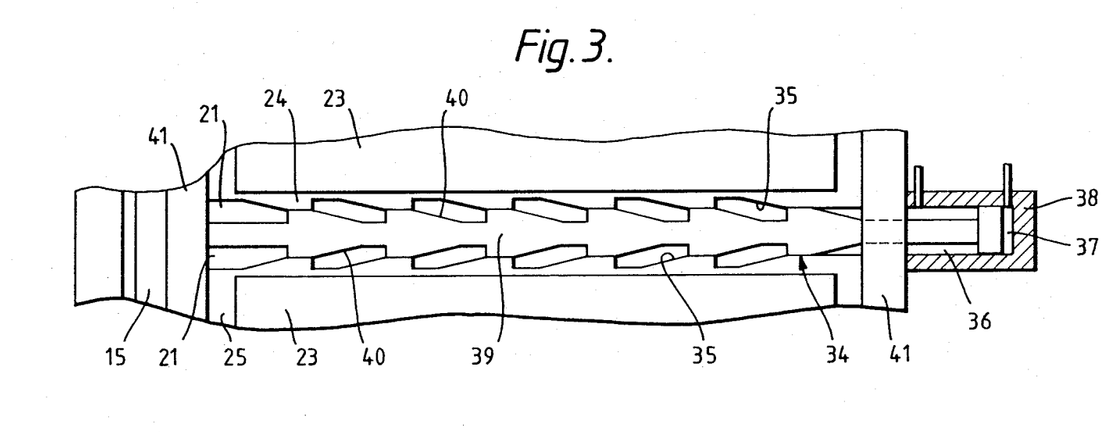
FIG. 3 is a view in the direction of arrow B of FIG. 2.

Each ram 34 is movable longitudinally by application of pressurised hydraulic fluid to either of two chambers 36,37 of a control cylinder 38 secured to an end of the inner rigid member 15. The ram comprises a connecting rod which extends from the cylinder 38 to an actuating portion 39 formed with a wedge shape profile along each of a pair of opposite edges 40 which engage the edge surfaces 35 of inner support members 24,25.

The edge surfaces 35 are formed with complementary shaped wedge profiles and actuation of the ram to move it to the position shown in FIG. 3 results in the confronting surfaces 24,25 being forced apart until the other longitudinal edge surfaces of the inner support members come close together or contact, the layers of elastomeric material simultaneously being loaded in radial compression by virtue of the shape and orientation of the bonded surfaces 27,28.

In the assembled and pre-stressed assembly of FIG. 2 the bush 10 comprising the stressed layers 23 serves to act as a cross-load bearing which has a high radial and torsional stiffness in combination with a low axial stiffness. To restrict unduly excessive relative longitudinal movement of the inner rigid member 15 and leg structure 17 the member 15 is provided with a pair of radially outwardly extending and circumferentially continuous abutments 41 arranged to contact the ends of outer rigid support members 26 in the event of large axial movement.

One of the abutments 41 is provided with four openings (not shown) through each of which extends the connecting rod of a ram 34 to interconnect between the associated control cylinder 38 and actuating portion 39.

Although in the above-described construction the abutments 41 are circumferentially continuous, that is not essential. At least one of the abutments may define a gap through which the resilient bearings 22 and rams 34 may be introduced to lie between the members 15 and leg structure 17. In that case it is not necessary to pre-assemble the bearings 22 and rams 34 around the inner member 15 before insertion of the latter into the leg structure.

In the above-described construction the resilient bearings are of a kind which in the assembled condition have substantially equal levels of pre-compression at each of the longitudinal edges 32,33 of each layer of elastomeric material. Although generally this is preferred, in alternative constructions the pre-compression at one longitudinal edge may be greater than at the other longitudinal edge.

Figure 7:
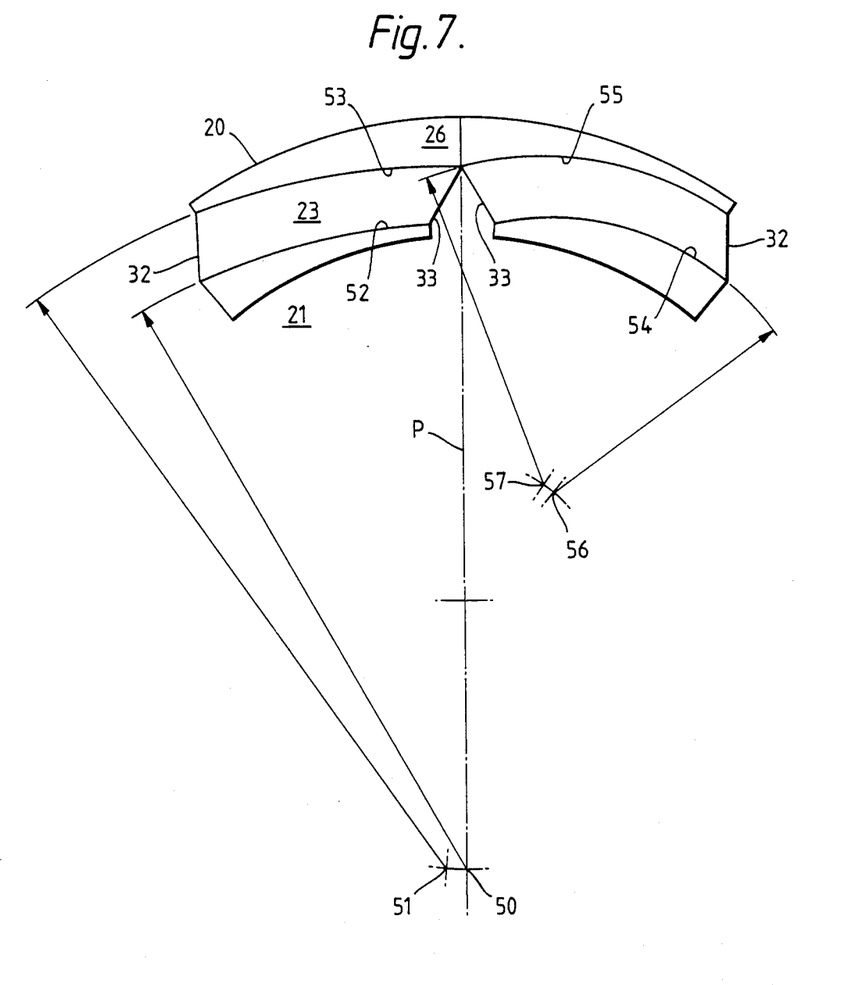
FIG. 7 shows geometrical aspects of parts of two other bushes in accordance with the present invention.

FIG. 7 illustrates two such alternative constructions.

In case 1 which shows elastomer layers 23 unstressed the centres of curvature 50,51 of the bonded interfaces 52,53 lie respectively at and close to the equatorial plane P which extends through the centre of curvature 31 of the bush and bisects an outer rigid support member unit 26. The radii of curvature of the cylindrical surfaces 20,21 and relative lateral movement of the support members in the circumferential direction results in a greater compression at the outer longitudinally extending edge surface 32 of the elastomeric layer than at the inner edge surface 33.

In case 2 the radii of curvature of the bonded interfaces 54,55 are significantly less than those of the surfaces 20,21. The axes of curvature 56,57 of the surfaces 54,55 lie significantly displaced from the plane P, on the same side of the plane as the surfaces 54,55. Relative lateral movement of the support members in the circumferential direction to effect pre-compression results in a greater compression at the inner edge surface 33 of the elastomeric layer than at the outer edge surface 32.

In contrast to the provision of a single layer 23 of elastomeric material in each of the resilient bearings described above with reference to FIGS. 1 to 6, an interleaved type of resilient member may be provided between confronting surfaces of inner and outer bearing support members.

Figure 8:
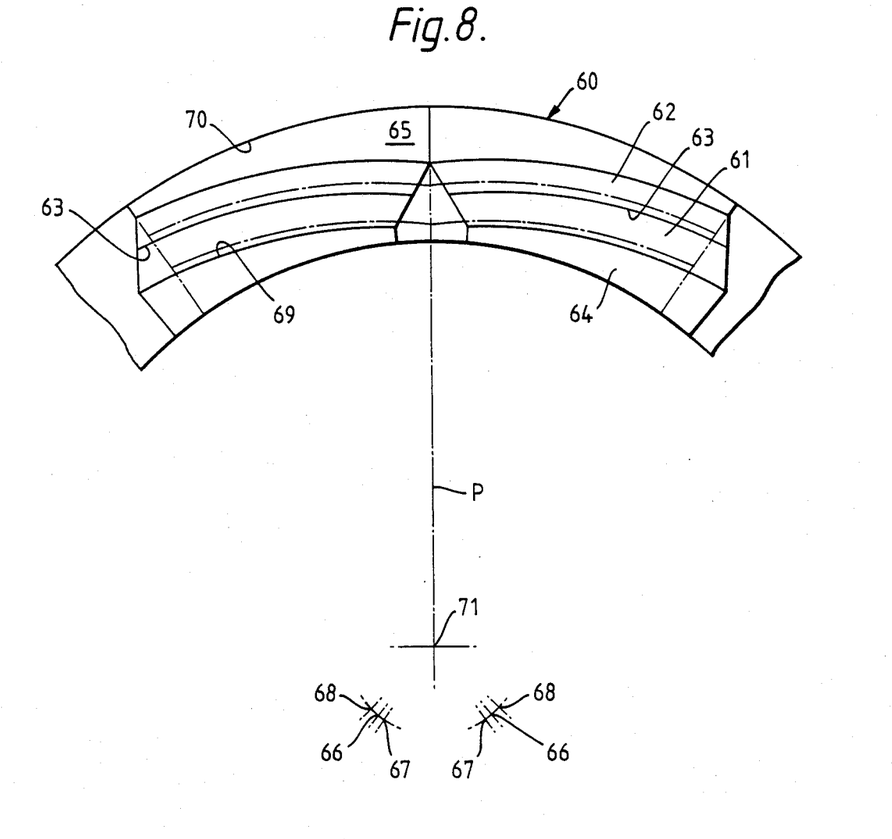
FIG. 8 is a view similar to that of FIG. 6 of a bush in accordance with another embodiment of the present invention.

FIG. 8 shows one such type of resilient bearing 60 which comprises two layers 61,62 of resilient elastomeric material interleaved by a layer 63 of reinforcing metal, the layers 61 and 62 being bonded respectively to inner and outer support members 64,65.

Prior to lateral movement of the support members to compress the resilient material the metal interleaf 63 has a part-cylindrical shape the axis of curvature 66 of which lies between the axes of curvature 67,68 of the bonded interfaces 60,70. Subsequent to pre-compression of the resilient material by rotation of the inner support members about the central axis 71 the axes 66,67 of curvature of the inner interface 69 and interleaf 63 moves to become coincident with the axis 68 of surface 70.

What I claim is:

1. A resilient torsion bush comprising an inner rigid member, a substantially inextensible outer rigid member which extends around and is spaced from the inner rigid member and interposed between said rigid members at least one pair of resilient bearings, each resilient bearing comprising a layer of resilient material disposed between and adhered to a pair of rigid support members, one rigid support member of said pair being an inner support member supported by the inner rigid member and the other rigid member of said pair being an outer support member supported by the outer rigid member and said support members being movable or having been moved one relative to the other in a peripheral direction as considered in a plane perpendicular to the direction of the length of the bush whereby the resilient material becomes or is loaded in compression between said support members as considered in a generally radial direction of the bush, and at least one of the confronting surfaces of said inner and outer rigid support members of a resilient bearing being inclined relative to said peripheral direction of relative movement of the support members whereby said movement results in compression of the interposed resilient material, said pair of said bearing being disposed such that the sheer load of one bearing due to relative movement of its associated support members to effect compression loading substantially equals and opposes the shear load of the other bearing due to relative movement of its associated support members.

2. A resilient torsion bush according to claim 1 wherein said confronting surfaces are of part-cylindrical shape and have a common axis of the curvature when the support members have been moved to load the interposed resilient material in compression.

3. A resilient torsion bush according to claim 1 wherein at least one of the respective pairs of confronting surfaces of the bearing support members and rigid inner and outer members is inclined relative to said direction of relative movement whereby relative movement of the support members in said peripheral direction results in compression of the interposed resilient material.

4. A resilient torsion bush according to claim 1 wherein an expansion device is provided to act between said rigid support members.

5. A resilient torsion bush according to claim 4 wherein said expansion device is operable to move one support member relative to the other in said peripheral direction to load in generally radial compression that resilient material positioned between inner and outer support members and wherein said expansion device serves to lock the support members relatively positioned in the peripheral direction with the resilient material in radial compression.

6. A resilient torsion bush according to claim 5 wherein the expansion device comprises a connecting rod connected to a control cylinder whereby application of pressurized fluid to the control cylinder causes movement of the expansion device to and/or from a locked position at which the device maintains the support members relatively positioned from compression of the interposed resilient material.

7. A resilient torsion bush according to claim 1 wherein either the inner or the outer rigid support members of the two bearings of said pair are integral with one another.

8. A resilient torsion bush according to claim 1 wherein at least one resilient bearing extends over substantially the whole of the longitudinal, axial length of the bush.

9. A resilient torsion bush according to claim 1 wherein as considered in a longitudinal, axial direction there are at least two resilient bearings or circumferentially extending groups of bearings.

10. A resilient torsion bush according to claim 9 wherein said at least two groups of bearings are spaced apart in said axial direction.

11. A resilient torsion bush according to claim 1 wherein the inner and outer rigid members respectively define cylindrically shaped and confronting radially outwardly and inwardly facing surfaces.

12. A resilient torsion bush according to claim 11 wherein the cylindrical radially inwardly facing surface has a diameter of at least 150 mm.

13. A resilient torsion bush according to claim 12 wherein said diameter is at least 300 mm.

14. A resilient torsion bush according to claim 1 wherein the outer rigid member is a tubular member.

15. A resilient torsion bush assembly comprising a resilient bush according to claim 1 wherein the outer rigid member is comprised by part of an offshore structure.

16. An offshore assembly comprising a floating structure and a seabed structure interconnected by a mooring line, said mooring line being secured to at least one of said structures by a flexible joint comprising a resilient torsion bush according to claim 1.

17. An offshore structure according to claim 16 and comprising means for remotely causing pre-compression load to be applied to or released from said resilient bearing.

18. An offshore structure according to claim 17 wherein said means comprises an hydraulically or pneumatically operable expansion device.

19. A resilient bush comprising an inner rigid member, a substantially inextensible outer rigid member which extends around and is spaced from the inner rigid member and interposed between said rigid members at least one resilient bearing, said bearing comprising a layer of resilient material disposed between and adhered to a pair of rigid support members, one rigid support member of said pair being an inner support member supported by the inner rigid member and the other rigid member of said pair being an outer support member supported by the outer rigid member and said support members being movable or having been moved one relative to the other in a peripheral direction as considered in a plane perpendicular to the direction of the length of the bush whereby the resilient material becomes or is loaded in compression between said support members as considered in a generally radial direction of the bush and an expansion device positioned to act between said rigid support members, said expansion device being operable to move one support member relative to the other in said peripheral direction to load in generally radial compression that resilient material positioned between inner and outer support members and wherein said expansion device serves to lock the support members relatively positioned in the peripheral direction with the resilient material in radial compression.

20. A resilient bush according to claim 19 wherein the expansion device comprises a connecting rod connected to a control cylinder whereby application of pressurized fluid to the control cylinder causes movement of the expansion device to and/or from a locked position at which the device maintains the support members relatively positioned for compression of the interposed resilient material.

* * * * *